3,340,002
METHOD OF MANUFACTURING GERMANIUM-CONTAINING PRODUCTS SUBSTANTIALLY FREE OF FLUORINE FROM LIQUIDS CONTAINING FLUORINE AND GERMANIUM
Gerardus Johannes Meyst and Adrianus Cornelis Josephus Maria Snethorst, Emmasingel, Eindhoven, Netherlands, assignors to North American Philips Company, Inc., New York, N.Y., a corporation of Delaware
No Drawing. Filed Nov. 26, 1963, Ser. No. 326,200
Claims priority, application Netherlands, Dec. 4, 1962, 286,332
3 Claims. (Cl. 23—22)

ABSTRACT OF THE DISCLOSURE

Remove fluorine from solution containing fluorine and germanium ions by precipitating out fluoride ions as alkaline earth fluorides, for example calcium fluoride. Germanium is then precipitated out and converted to germanium oxide. This abstract is not intended to be a description of the invention defined by the claims.

This invention relates to a method of manufacturing a germanium-containing product, substantially free of fluorine, from liquids containing fluorine and germanium. Such liquids are obtained, for example, upon treatments of germanium bodies with etchants containing fluorine, which treatments are carried out, for example, in the manufacture of semiconductor electrode systems, such as transistors, diodes, and photocells, which comprise a semiconductor body of germanium. Since germanium is a comparatively expensive element, methods have previously been suggested for recovering the germanium from germanium-containing etching residues, obtained in the manufacture of semiconductor electrode systems. During this recovering process it had already been found that the presence of fluorine caused difficulty and it has therefore previously been suggested to bring about a separation between the fluorine and the germanium by endeavouring to deposit the germanium from the solution and to maintain the fluorine in the dissolved state. In accordance with such a known method it has been suggested to deposit the germanium from the liquid as ammonium germanate. However, it has been found that, in the known method, the precipitate may still contain considerable amounts of fluorine, which is attributable to fluorine ions having a strong tendency of binding to germanium ions.

An object of the invention is inter alia to provide a method of obtaining a germanium-containing product which is substantially free from fluorine. It is based upon the idea that in a liquid containing germanium and fluorine ions in the dissolved state, an interaction between free fluorine ions and fluorine ions bonded to germanium takes place which is much more rapid than that between a precipitate containing germanium and fluorine and the liquid containing the precipitate.

According to the invention, in a method of the kind mentioned in the preamble, the fluorine of the liquid to be treated is precipitated and separated from the liquid, whereafter the germanium-containing filtrate is worked up further. According as the fluorine ions disappear from the solution, more and more fluorine ions bonded to the dissolved germanium pass into the liquid as free ions and are likewise precipitated.

Preferably the fluorine is precipitated in the form of calcium-fluoride.

The precipitation of calcium fluoride may be accompanied by the deposition of germanium. In weakly-acid medium, germanium hydroxide may then be formed and slowly change into germanium oxide. However, this germanium oxide has been found to be difficulty soluble at a later stage. Now, calcium carbonate is preferably used for obtaining the calcium fluoride deposit. In this case a pH value of at least 6 can be obtained, the germanium not being deposited in the form of germanium oxide. Preferably a sufficient amount of calcium carbonate must be added to obtain to said pH value at the end of the precipitation. This pH value also provides a good indication of whether so much has been added that the fluorine is precipitated almost completely. The liquid to be treated is preferably added to an aqueous suspension of calcium carbonate. So long as calcium carbonate remains present in it, the pH remains about 6 on adding the liquid to be treated, so that the formation of germanium oxide is avoided. When the pH value decreases below 6, it may be raised again by adding calcium carbonate.

After completion of the precipitation, the liquid containing the precipitate is preferably acidified in order to dissolve again any calcium germanates deposited. The acidifying process preferably takes place until the pH is not more than 3, whereafter the residual deposit is filtered off. Germanium oxide is not formed at a pH value of not more than 3. The filtrate now contains the germanium and is also substantially free of fluorine. The germanium may be precipitated from the filtrate, preferably by making it ammoniacal and adding, if necessary, additional calcium ions, for example in the form of calcium chloride. The resulting precipitate, which consists at least substantially of calcium-ammonium germanate, may be separated from the remaining liquid, for example by filtering. It is substantially free of fluorine and contains, at least substantially, the total amount of the germanium present in the initial liquid to be treated.

The invention will now be explained in detail with reference to an example.

The liquid to be treated is obtained by chemically etching germanium bodies with acid etching-liquids containing HF and one or more oxidizing agents, for example nitric acid and/or hydrogen peroxide.

15 kgs. of comparatively coarse-grained calcite (mean size of grain from 50 to 200 microns) are added, while stirring, to 70 litres of water of 80° C. Then 250 litres of the liquid to be treated, containing germanium and fluorine, are progressively added. During or after this additton, further calcite is added until the foaming caused by the development of carbon dioxide ceases. The additional amount of calcite to be added may differ according to the composition of the liquid to be used. As a rule, further addition of 30 to 50 kgs. of calcite is sufficient. The pH value is then about 6, which may be tested in known manner, for example, with the aid of a suitable slip of indicator paper.

Subsequently, concentrated nitric acid (specific weight 1.3) is added while stirring slowly until a pH value 2 is reached, again measured with the aid of a suitable slip of indicator paper. In the meantime the resulting mixture is continuously being stirred and, subsequently, the resulting deposit is filtered off. This deposit, which substantially consists of calcium fluoride, is found to be sufficiently coarse-grained to permit a reasonably fast filtration. The pH of the resulting filtrate is regularly tested during filtering with the aid of a slip of indicator paper. If the pH value is higher than 3, a little nitric acid is added to the mixture still to be filtered, until the pH of the filtrate is again not more than 3. The deposit is subsequently washed with 50 litres of dilute nitric acid having a pH of about 2 and the rinsing liquid is added to the filtrate already obtained.

The resulting liquid is stirred and mixed with 20 litres of calcium-chloride solution containing about 28% by weight of $CaCl_2$, while the temperature of the liquid is progressively raised to about 100° C. Then ammonia (25% by weight in water) is progressively added to the liquid while continuously stirring and maintaining the temperature at about 100° C., until the liquid in the second vessel has acquired a pH of 9.2. A precipitate well capable of being filtered results which contains germanium, at least substantially, in the form of calcium germanates, chiefly calcium-ammonium germanate, and which is substantially free of fluoride. The deposit is filtered off and subsequently rinsed with about 50 litres of water, followed by drying. During this process the calcium-ammonium germanate can change to calcium hydrogermanate while giving off ammonia. The resulting material may be worked in the usual manner to form germanium, for example by treatment with concentrated hydrochloric acid and evaporation of the resulting germanium chloride, which may be further purified and then converted, for example, into germanium dioxide which is reducible into germanium in the usual manner.

It is to be noted that the heating of the liquid obtained after filtering the calcium fluoride may be omitted, if desired, for example if the initial liquid to be treated contains much hydrogen peroxide, so that, on making the liquid ammoniacal while heating, a strong development of foam may occur.

An example of preparing germanium oxide from the substantially fluor-free germanium concentrate, as prepared according to the above example, will now be described. These subsequent processes may be carried out using apparatus of quartz glass or other glass without danger of chemical reaction of the glass with the compounds and materials taking part in these processes.

To the calcium and germanium containing concentrate as prepared according to the above example concentrated hydrochloric acid (36% by weight) is added in an amount of 10% over the amount required for the formation of $GeCl_4$ and $CaCl_2$. In a distillation apparatus the mixture is heated to boiling germanium chloride distilling out of the mixture and being condensed and collected. The boiling temperature of the mixture rises from about 80° C. to about 110° C., further heating being stopped when the latter temperature is reached. The germanium chloride liquid obtained by distillation is washed with an equal volume of concentrated hydrochloric acid (36%) of analytical quality, both liquids being intimately mixed by shaking and mechanical vibration. Then the two liquids are separated by standing, the lower liquid being germanium chloride. The germanium chloride is further purified by fractional distillation using a rectifying column, e.g. a vigreux column. The germanium oxide is formed by adding the germanium chloride to de-ionized water at a temperature just below 80° C., the amount of water used being such that it forms with the hydrochloride liberated by the hydrolising reaction a concentrated hydrochloric acid solution of 36%. The germanium oxide is recovered by filtration and is dried in vacuum in a quartz glass container.

The germanium oxide may be reduced to germanium in known manner as for instance described in the book of Hunter, "Handbook of Semi-Conductor Electronics," first ed. (1956), pages 6–2 to 6–5. Use may be made of a graphite boat placed in a quartz tube, through which a current of highly purified hydrogen is passed. The reaction with the hydrogen is carried out at a temperature between 600° C. and 700° C., e.g. 650° C. At higher temperatures germanium monoxide (GeO) may evaporate. After the reduction step the temperature may be increased to about 1000° C. the germanium formed being melted. After cooling a germanium rod is formed which may be treated further in known manner, e.g. further purified by zone melting.

It is also to be noted that the invention is not limited to the embodiment given by way of example, but that several other embodiments are possible without passing beyond the scope of the invention.

What we claim is:

1. A method of producing a germanium compound substantially free of fluorine from an aqueous solution of germanium and fluorine ions said method comprising the steps, mixing an aqueous solution containing germanium and fluorine ions with a sufficient quantity of calcium carbonate, while maintaining the pH of said solution at a value of at least 6, until substantially all the fluoride ions have been precipitated out of said solution as calcium fluoride, removing said calcium fluoride precipitate from the solution, adding ammonia and sufficient calcium ion to the resultant filtrate to cause substantially all the germanium ion to be precipitated out of the solution as calcium ammonium germanate, and separating the resultant calcium ammonium germanate from the solution.

2. The method of claim 1 wherein calcium fluoride precipitate is washed with an aqueous acid to dissolve any calcium germanate coprecipitated and the wash liquid is added to the germanium containing solution.

3. The method of claim 2 wherein the aqueous acid is hydrochloric acid and the precipitate is acidified to a value not greater than 3.

References Cited

UNITED STATES PATENTS

| | | | |
|---|---|---|---|
| 2,910,346 | 10/1959 | Manns | 23—23 |
| 2,949,340 | 8/1960 | Rosner | 23—22 X |
| 2,953,453 | 9/1960 | Foos. | |

OSCAR R. VERTIZ, *Primary Examiner.*

H. T. CARTER, *Assistant Examiner.*